(12) United States Patent
Tani et al.

(10) Patent No.: US 7,859,794 B2
(45) Date of Patent: Dec. 28, 2010

(54) MAGNETIC HEAD SLIDER AND MAGNETIC DISK DRIVE

(75) Inventors: Hiroshi Tani, Kanagawa-ken (JP); Sunao Yonekawa, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 750 days.

(21) Appl. No.: 11/904,689

(22) Filed: Sep. 27, 2007

(65) Prior Publication Data

US 2008/0080094 A1    Apr. 3, 2008

(30) Foreign Application Priority Data

Sep. 29, 2006    (JP)    .............................. 2006-268194

(51) Int. Cl.
*G11B 5/60*    (2006.01)

(52) U.S. Cl. ................................. 360/235.7

(58) Field of Classification Search ............ 360/125.31, 360/125.74, 234.4, 235.4, 235.7, 235.8, 236.3, 360/236.5, 237
See application file for complete search history.

(56) References Cited

U.S. PATENT DOCUMENTS

| | | | |
|---|---|---|---|
| 6,556,381 B2 * | 4/2003 | Kohira et al. | 360/236.3 |
| 6,633,455 B2 | 10/2003 | Tokisue et al. | |
| 6,690,016 B1 * | 2/2004 | Watkins et al. | 250/341.7 |
| 6,795,275 B2 * | 9/2004 | Anan et al. | 360/235.7 |
| 7,095,587 B2 | 8/2006 | Kurita et al. | |
| 7,164,556 B2 * | 1/2007 | Kohira et al. | 360/235.7 |
| 7,184,244 B1 * | 2/2007 | Haddock et al. | 360/235.7 |
| 7,420,760 B2 * | 9/2008 | Zhang et al. | 360/75 |
| 7,558,022 B2 * | 7/2009 | Kurita et al. | 360/234.4 |
| 7,649,714 B2 * | 1/2010 | Kato et al. | 360/234.4 |
| 7,679,863 B2 * | 3/2010 | Hashimoto et al. | 360/235.7 |
| 7,729,088 B2 * | 6/2010 | Kurita et al. | 360/234.4 |

FOREIGN PATENT DOCUMENTS

| | | |
|---|---|---|
| JP | 2003-099910 A | 4/2003 |
| JP | 2004-241092 A | 8/2004 |

* cited by examiner

*Primary Examiner*—Angel A. Castro
(74) *Attorney, Agent, or Firm*—Mahamedi Paradice Kreisman LLP; Christopher J. Brokaw

(57) ABSTRACT

Embodiments of the present invention help to prevent, in a magnetic head slider adapted to be able to control flying height of a head element, the occurrence of excessive frictional force, even in case of contact with a magnetic disk, and suppress vibration of the slider. According to one embodiment, an air bearing surface of a magnetic head slider includes a deep groove, a shallow-trench rail about 100 nm higher than the deep groove, a rear end shoulder, two leading end pads about 1 μm higher than the deep groove, a trailing end pad about 970-995 nm higher than the deep groove, and an element pad about 5-30 nm higher than the trailing end pad and flush with the leading end pads. A head element includes a magnetic head element and a heater. The element pad has an area of 50-500 μm², and the magnetic head element is disposed near a central section of the element pad.

11 Claims, 8 Drawing Sheets

MAGNETIC HEAD SLIDER AND MAGNETIC DISK DRIVE

CROSS-REFERENCE TO RELATED APPLICATION

The instant nonprovisional patent application claims priority to Japanese Patent Application No. 2006-268194 filed Sep. 29, 2006 and which is incorporated by reference in its entirety herein for all purposes.

BACKGROUND OF THE INVENTION

Magnetic disk drives that are widespread in use as storage devices for image data and the like, including the external storage devices of computer systems, are required to be higher in recording density, larger in capacity, and more compact. To achieve a higher recording density, a larger capacity, and more compactness, it is effective to raise linear recording density by minimizing the distance between the magnetic head slider and the magnetic disk, that is, the flying height of the magnetic head slider. In recent years, magnetic head sliders adjustable in flying height by mounting a heater in the neighborhood of a read/write element have been developed and this, in turn, has made it possible to reduce the flying height of the read/write element, even when there are changes in operating environment.

A magnetic head slider adjustable in flying height is disclosed in Japanese Patent Publication No. 2005-056447 ("Patent Document 1"), for example. Patent Document 1 also discloses a configuration in which the heater and the read/write element are surrounded with a resin film of low rigidity to make only the neighborhood of the heater and the read/write element project deform.

Japanese Patent Publication No. 2003-099910 ("Patent Document 2") discloses a magnetic head slider configuration in which, an intermediate stepped face deeper than a stepped bearing surface and higher than a negative-pressure grooved face is provided between the stepped bearing surface and the negative-pressure grooved face, on the pad located at the trailing end of the magnetic head slider, in order to prevent the lubricant accumulated on the slider from coming into contact with a magnetic disk surface and consequently causing the slider to vibrate, even when the flying height, that is, the clearance between the magnetic head slider and the magnetic disk surface, is narrowed.

For a magnetic head slider that controls the flying height of the read element or write element of a magnetic head by using thermal expansion due to the heat from a heater, the flying height of the head element on the slider is likely to become a minimum. Accordingly, if the head element comes into contact with a magnetic disk, frictional force due to the meniscus force, van der Waals force, or other force caused by the lubricant on the magnetic disk during such contact may vibrate the head slider, resulting in the head element being worn or damaged. Particularly for a head element inferior in read/write characteristics, since reducing the flying height by conducting height control using thermal expansion is preferable for read/write operations, a risk of the head element wear or damage correspondingly increases. In addition, when a perpendicular magnetic recording medium is combined with such a magnetic head slider, the recording medium, compared with a longitudinal magnetic medium, does not require a texture that assigns magnetic anisotropy. It is preferable in terms of flying performance, therefore, that surface roughness be reduced to its minimum. Therefore, the surface roughness of the perpendicular magnetic recording medium is set to be up to 0.3 nm in centerline average roughness "Ra". There is the problem, however, that as the surface roughness of the perpendicular magnetic recording medium becomes less significant, the magnetic head slider vibrates more easily since, as discussed above, larger frictional force is caused by contact of the slider with the magnetic disk.

Patent Documents 1 and 2 above, relating to the respective magnetic head sliders that control the flying height of the read element or write element of the magnetic head by using thermal expansion due to the heat from the heater, do not describe alleviating the frictional force caused by contact of the head element with the magnetic disk, or preventing the vibration of the slider due to the frictional force.

Furthermore, for a magnetic head slider that controls the flying height of a head element by using thermal expansion due to heat from a heater, since the flying height of the head element becomes a minimum, if the head element comes into contact with a magnetic disk, the frictional force occurring during the contact may vibrate the slider, resulting in head element wear and/or damage.

BRIEF SUMMARY OF THE INVENTION

Embodiments in accordance with the present invention help to prevent, in a magnetic head slider adapted to be able to control flying height of a head element, the occurrence of excessive frictional force, even in case of contact with a magnetic disk, and suppress vibration of the slider. According to the particular embodiment shown in FIG. 1, an air bearing surface 6 of a magnetic head slider 1 includes a deep groove 8, a shallow-trench rail 10 about 100 nm higher than the deep groove 8, a rear end shoulder 12, two leading end pads 14 about 1 µm higher than the deep groove 8, a trailing end pad 16 about 970-995 nm higher than the deep groove 8, and an element pad 18 about 5-30 nm higher than the trailing end pad 16 and flush with the leading end pads 14. A head element 4 includes a magnetic head element 20 and a heater 26. The element pad 18 has an area of 50-500 $\mu m^2$, and the magnetic head element 20 is disposed near a central section of the element pad.

DETAILED DESCRIPTION OF THE INVENTION

Figure 1:
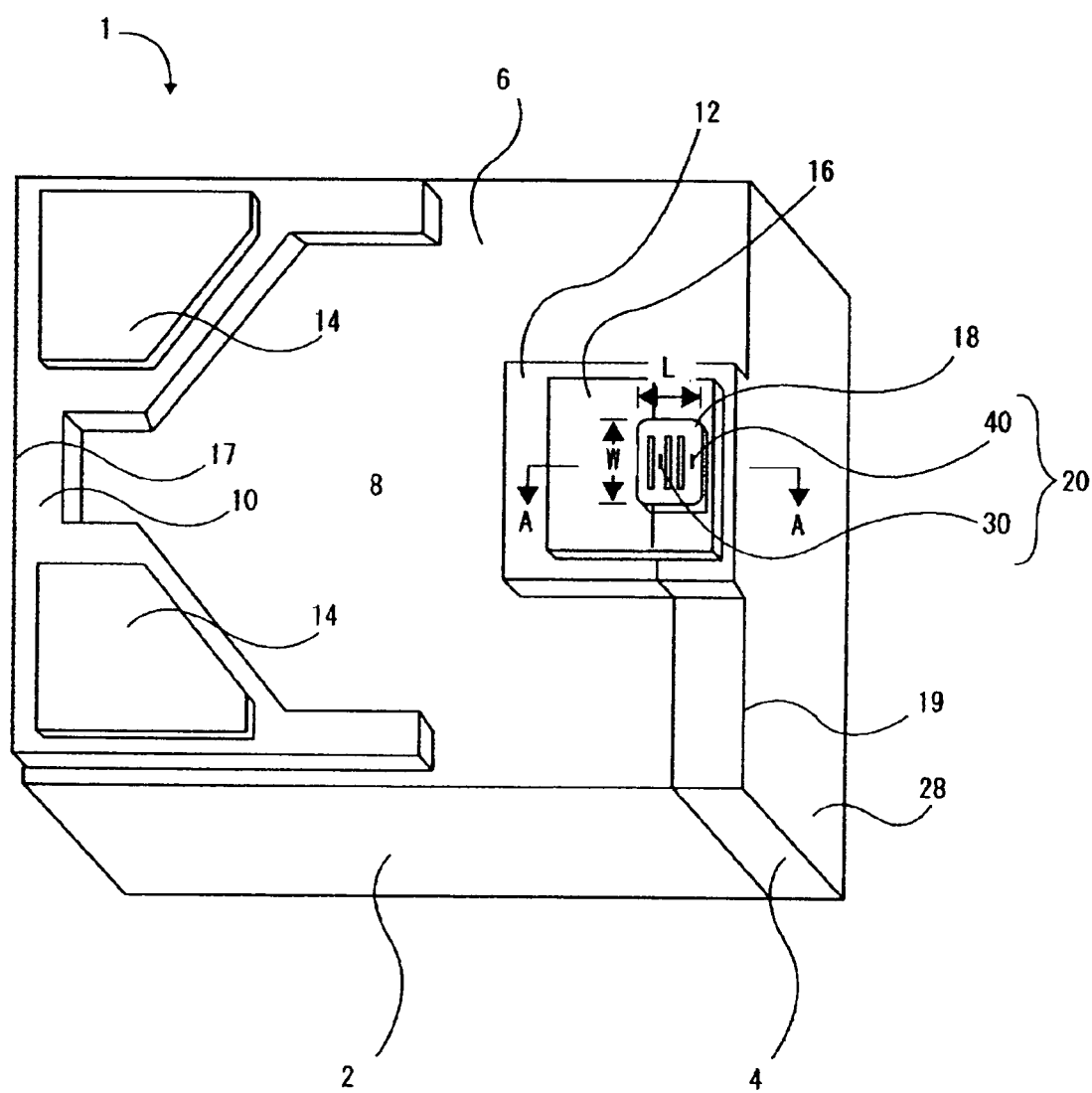
FIG. 1 is a perspective view showing a total configuration of a magnetic head slider according to an embodiment of the present invention.

Embodiments in accordance with the present invention relate to a magnetic head slider having a function that adjusts flying height with respect to a magnetic disk surface. Embodiments of the present invention also relate to a magnetic disk drive having the magnetic head slider mounted thereon.

An object of embodiments of the present invention is to prevent, in a magnetic head slider adapted to be able to control flying height of a head element, the occurrence of excessive frictional force, even in case of contact with a magnetic disk, and suppress vibration of the slider.

Another object of embodiments of the present invention is to provide a magnetic disk drive adapted to be able to reduce flying height of a magnetic head slider and realize high-density recording.

A magnetic head slider of embodiments of the present invention includes: a slider; a head element formed at an end of the slider, the head element including a heater, a read element, and a write element; a deep groove; a leading end side rail higher than the deep groove; a trailing end side rail higher than the deep groove; a leading end pad formed on the leading end side rail; and a trailing end pad formed on the trailing end side rail; wherein the deep groove, the leading end side rail, the trailing end side rail, the leading end pad, and the trailing end pad are each formed on an air bearing surface which forms part of the slider and the head element, and wherein an element pad is provided on the trailing end pad, the element pad including the read element and the write element, having an area of 50-500 $\mu m^2$, and being 5-30 nm higher than the trailing end pad.

The element pad may be of a rectangular, circular, or elliptical shape, or has polygonal corners of a circular arc shape.

In the magnetic head slider containing a heater, heat from the heater makes the head element suffer the most significant deformation among all constituent elements of the slider and project towards the magnetic disk. It is therefore possible to reduce frictional force and hence, slider vibration, by providing an element pad having the head element, and reducing the area of the element pad. Particularly when the heat from the heater is used to deform the element pad and make it project towards the magnetic disk, since the element pad projects in an inclined state with the flat air-bearing surface of the slider as a reference, the contact area of the element pad can be efficiently reduced. To prevent slider vibration, the area of the element pad needs to be 500 $\mu m^2$ or less. Conversely, if the area is too small, increased wear during contact is likely to occur, so an area of at least 50 $\mu m^2$ is suitable.

In addition, forming the element pad of the above magnetic head slider into a rectangular, circular, or elliptical shape, or forming the element pad to have polygonal corners of a circular arc shape makes it possible for a contact pressure on the magnetic disk to be reduced at the ends of the element pad, and for magnetic disk damage and slider vibration to be further reduced.

The magnetic disk drive of embodiments of the present invention includes a magnetic disk whose surface roughness is 0.25 nm or less in centerline average roughness "Ra" and the magnetic head slider described above. The flying height of the magnetic head slider can be reduced and even in case of contact, frictional force is suppressed to a low level. It is therefore possible to provide a magnetic disk drive high in recording density and in reliability.

According to embodiments of the present invention, the contact area of the head element existing when it comes into contact with the magnetic disk can be lessened and frictional force can be reduced. Reducing frictional force makes it possible to minimize head element wear and damage, since slider vibration due to the frictional force can be suppressed.

Figure 2:
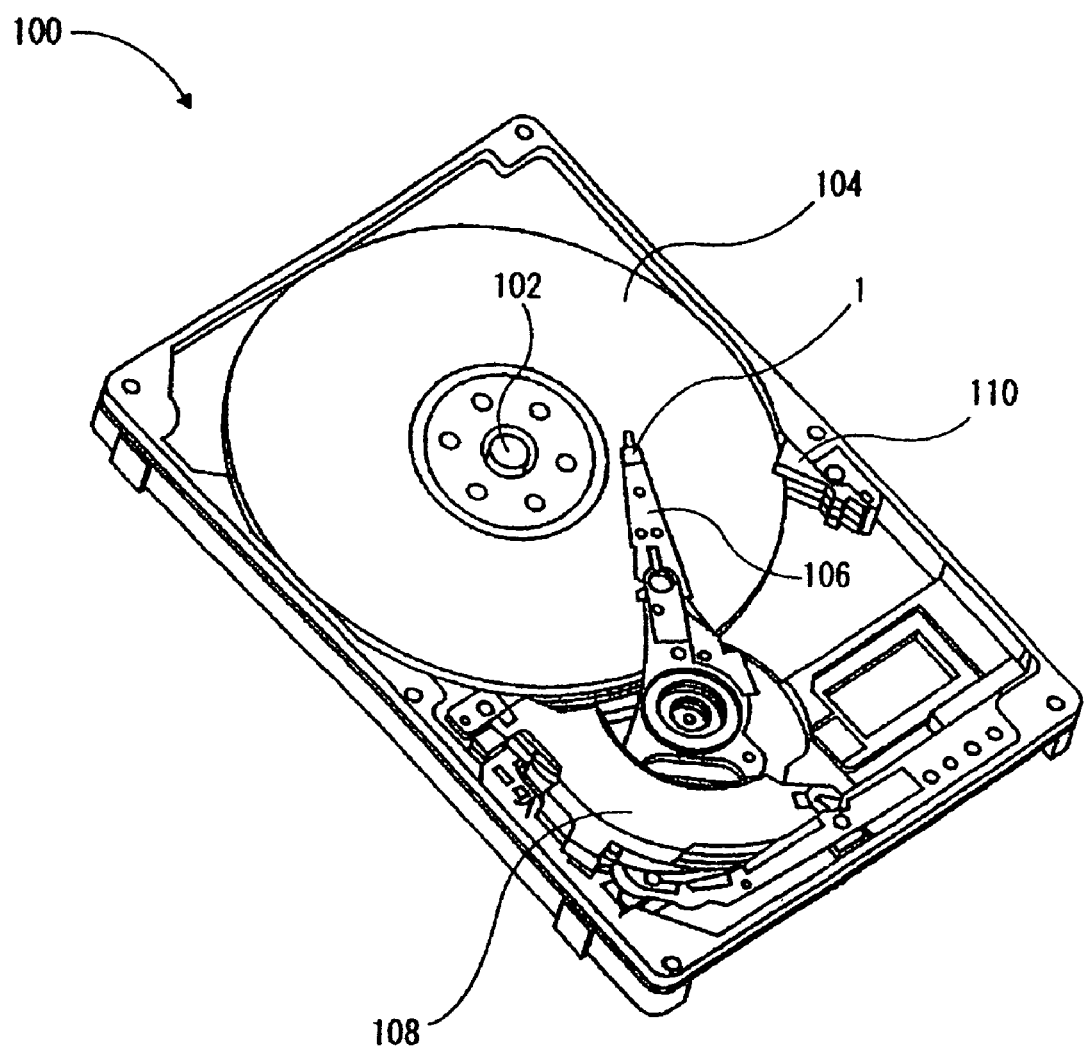
FIG. 2 is a top view of a magnetic disk drive to which the magnetic head slider according to an embodiment of the present invention is mounted.

First, a schematic configuration of a magnetic disk drive with a mounted magnetic head slider according to an embodiment of the present invention is described below with reference being made to FIG. 2. The magnetic disk drive 100 includes a magnetic disk 104 rotated by a spindle motor 102, and the magnetic head slider 1 supported by a suspension 106 and flies along the surface of the magnetic disk 104. The magnetic head slider 1 is positioned on a desired track of the magnetic disk 104 and reads/writes magnetic information. The positioning of the magnetic head slider 1 is accomplished by rotational driving of the suspension 106 by an actuator 108. As described later herein, the magnetic head slider 1 containing a heater in a neighboring position of a read/write element can control flying height of the magnetic head slider 1 by controlling electric power supplied to the heater. The magnetic disk 104 has a surface roughness of 0.25 nm or less in centerline average roughness "Ra". When the read/write operation by the magnetic disk drive 100 is being interrupted or stopped for a definite time, the actuator 108 unloads the magnetic head slider 1 onto a ramp mechanism 110. While the magnetic disk drive 100 has a load/unload mechanism for the magnetic head slider 1, the magnetic disk drive may employ a contact start/stop scheme in which the magnetic head slider 1 stands by in a specific region on the magnetic disk 104 when the drive is in a stopped state.

A total magnetic head slider configuration according to an embodiment of the present invention is shown in FIG. 1. The magnetic head slider 1 includes a slider 2 formed of a ceramic material such as alumina titanium carbide, and a head element 4 formed at an end of the slider 2. The slider 2 has essentially a rectangular parallelopiped shape and measures, for example, about 1.25 mm long, about 1.0 mm wide, and about 0.3 mm thick. An air bearing surface 6 of the magnetic head slider 1 includes a deep groove 8, a shallow-trench rail (leading end side rail) 10 about 100 nm higher than the deep groove 8, a rear end shoulder (trailing end side rail) 12, two pads 14 disposed on the shallow-trench rail 10 and about 1 $\mu m$ higher than the deep groove 8, a trailing end pad 16 disposed on the rear end shoulder 12 and about 970-995 nm higher than the deep groove 8, and an element pad 18 disposed on the trailing end pad 16, about 5-30 nm higher than the trailing end pad 16, and flush with the leading end pads 14. The air bearing surface 6 faces the magnetic disk, generates an air pressure, and serves as an air bearing to bear a load applied from the suspension to a back face of the bearing. The deep groove 8, the shallow-trench rail 10, the rear end shoulder 12, the leading end pads 14, the trailing end pad 16, and the element pad 18 are all formed by execution of an etching process such as ion milling. The head element 4 includes a heater 26 (see FIG. 3), a magnetic head element 20 constituted by a read element 30 and a write element 40, and a hard protective film 28 of alumina (or equivalent) to shroud the entire heater 26, magnetic head element 20, and protective film 28. The magnetic head element 20 has a front end exposed on the surface of the element pad 18.

The element pad 18 has an area of 50-500 $\mu m^2$, and the magnetic head element 20 is disposed near a central portion of the element pad 18. The entire head element 20 including a lower magnetic shield of the read element 30 is preferably disposed on the surface of the element pad 18. However, this disposition depends on a particular size of the magnetic head element 20. For reduced area of the element pad 18, the magnetic head element 20 may be disposed so that an end thereof such as the lower magnetic shield is positioned outside the element pad 18. It is possible to easily form such an element pad 18 by ion milling. FIG. 1 is a schematic representation of the total configuration, and the dimensions and others shown in the figure are not accurate. In addition, shoulder height is shown with emphasis.

When the magnetic head slider 1 flies along the surface of the magnetic disk, the magnetic head slider flies in such a position that the flying height at a leading end 17 is greater than at a trailing end 19. A section of the element pad 18 that is disposed near the trailing end 19, therefore, makes the closest approach to the magnetic disk.

Figure 3:
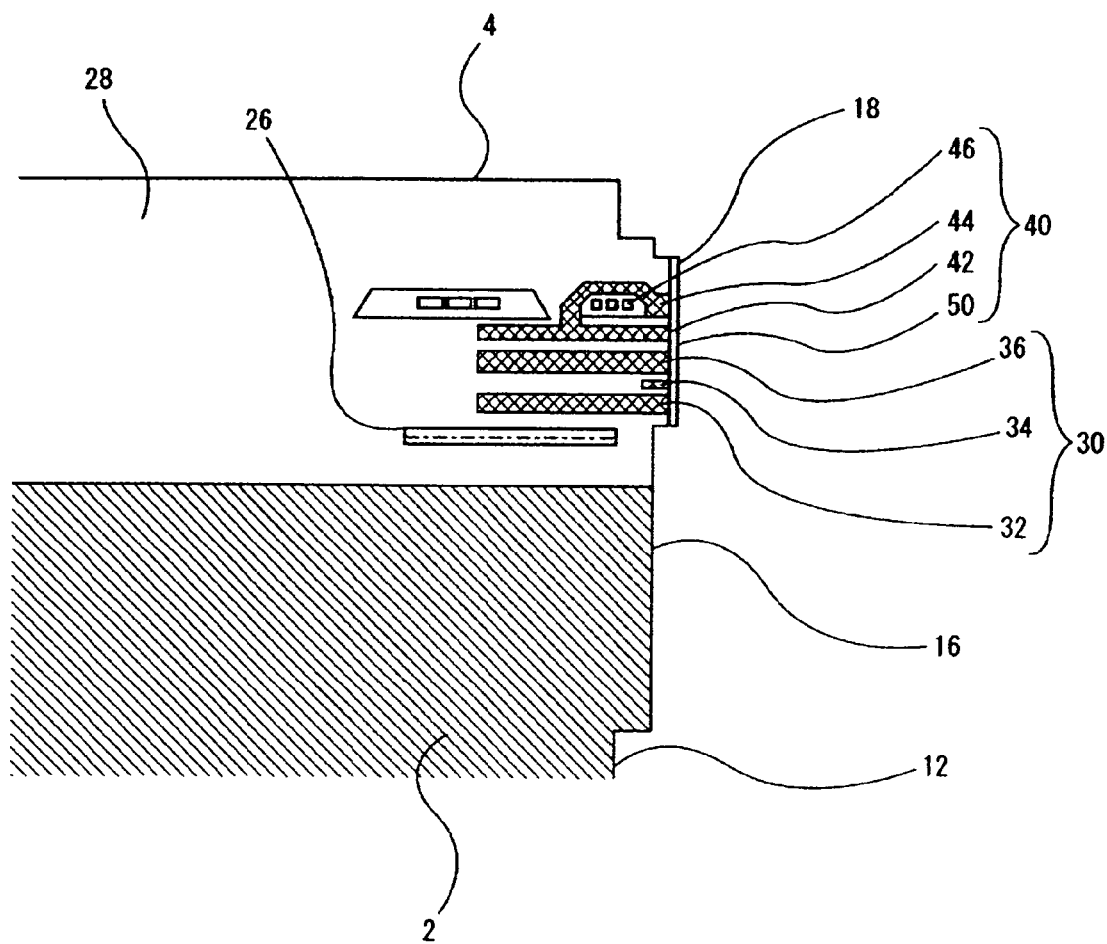
FIG. 3 is a sectional view taken along line A-A in FIG. 1, showing a head element in enlarged form.

FIG. 3 is a sectional view taken along line A-A in FIG. 1, showing in enlarged form a neighboring section of the element pad 18 that includes the magnetic head element 20. The magnetic head element 20 includes the read element 30 that reads written magnetic information from the magnetic disk, and the write element 40 that writes magnetic information onto the magnetic disk. The read element 30 has a magnetoresistive element 34 and an upper magnetic shield 36 in addition to the lower magnetic shield 32, and the write element 40 has a lower magnetic pole piece 42, a coil 46, and an upper magnetic pole piece 44. The heater 26 that controls the flying height of the magnetic head slider 1 at the element pad 18 is disposed between the lower magnetic shield 32 of the read element 30 and the slider 2. These elements are entirely covered with the hard protective film 28 of alumina. The trailing end pad 16 and the element pad 18 are formed on the air bearing surface, and the element pad 18 is formed to be 5-30 nm higher than the trailing end pad 16. On the element pad 18 most likely to come into contact with the magnetic disk, a carbon protective film 50 with a thickness of several nanometers (nm) is formed to avoid wear, even in case of brief and slight contact with the disk, and to prevent corrosion of the write element 40 and the read element 30. The read element, the write element, and the protective film are formed on a substrate provided as the slider 2, and the formation uses a thin-film forming process such as plating, sputtering, or lapping.

Figure 4:
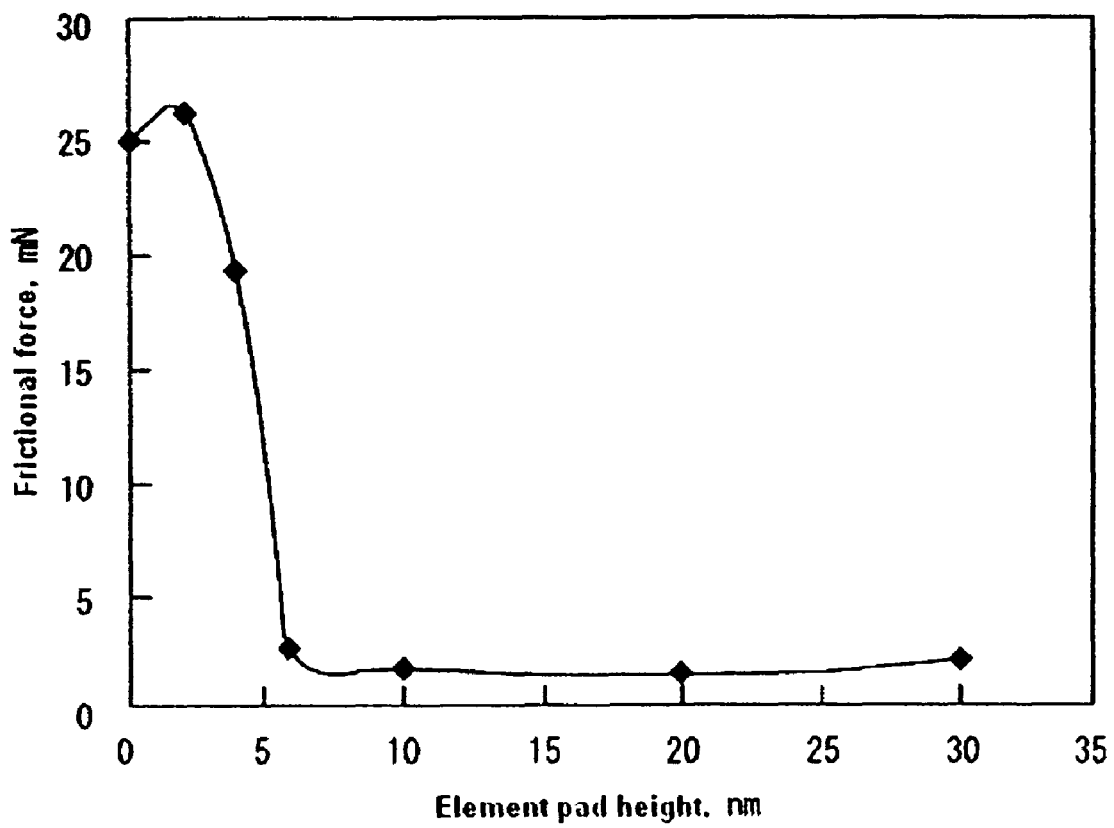
FIG. 4 is a diagram showing a relationship between element pad height and frictional force.

Next, a relationship between height of the element pad 18 of the magnetic head slider 1 according to the present embodiment, from the surface of the trailing end pad 16, and frictional force, is described below referring to FIG. 4. The relationship shown in FIG. 4 is based on experimental results that were obtained by using magnetic head sliders each formed with a rectangular, round-cornered element pad 18 measuring 10 μm in length L, 40 μm in width W, and 0 nm, 2 nm, 4 nm, 6 nm, 10 nm, 20 nm, 30 nm in height from the surface of a trailing end pad 16. Each of the magnetic head sliders is independently caused to fly along the surface of a perpendicular magnetic disk whose surface roughness is 0.2 nm in centerline average roughness "Ra". An ambient air pressure is adjusted for a flying height of about 6 nm at a head element position of the magnetic head slider. Under this state, the magnetic head slider is brought into contact with the magnetic disk so as to obtain a flying height of 4 nm at the head element position by supplying electric power of about 20 mW to a heater 26 and generating heat for reduced ambient air pressure. Measurement results on the frictional force generated under these conditions are shown in FIG. 4.

Figure 5A:
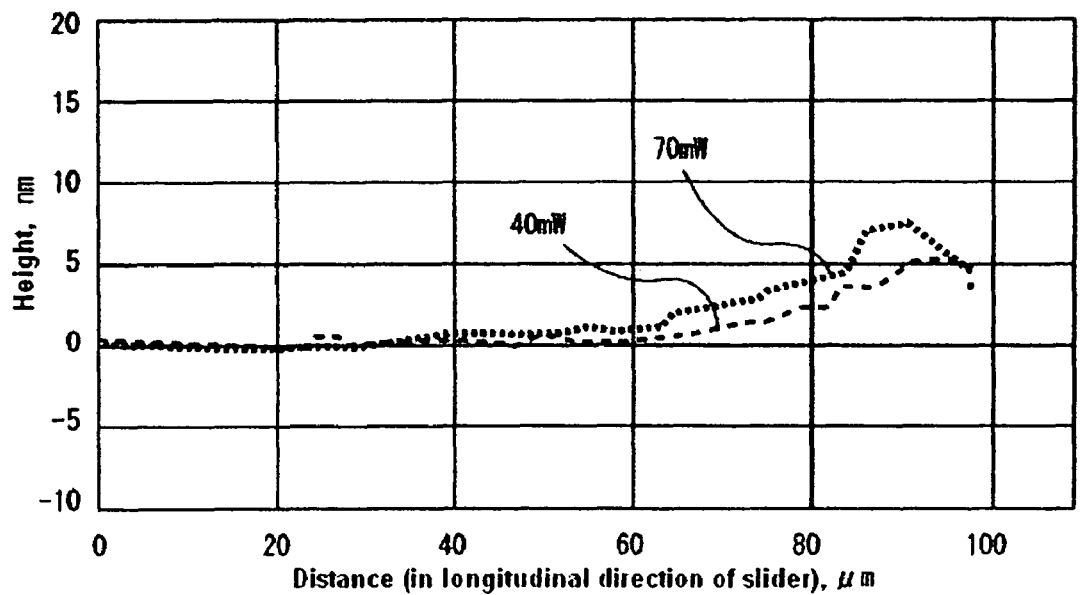
FIGS. 5(a) and 5(b) are diagrams showing a projecting profile of an element pad in a longitudinal direction of a slider.
Figure 5B:
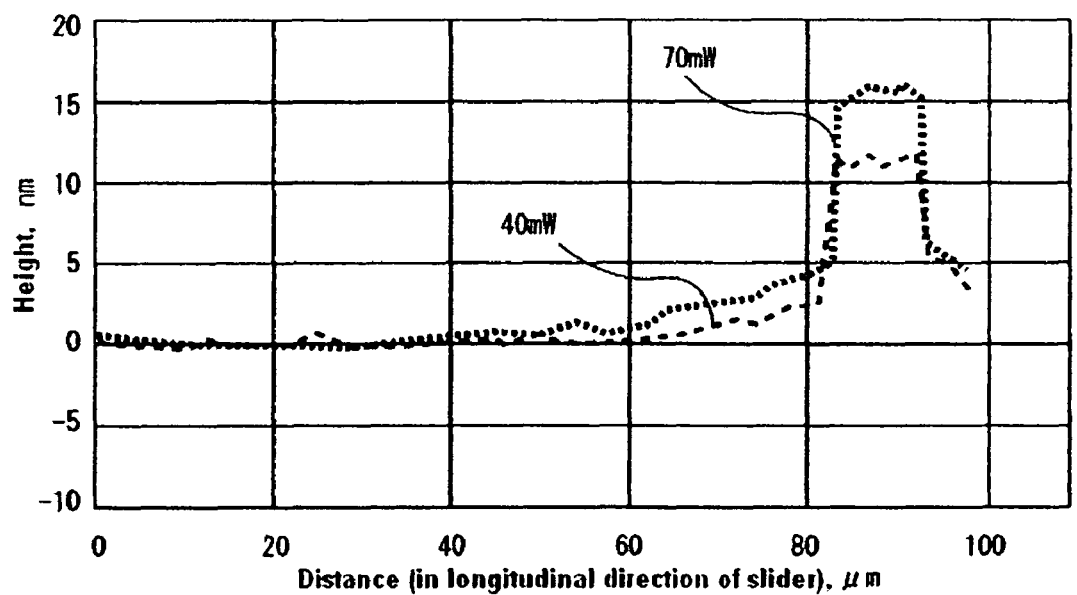

From FIG. 4 it can be seen that the frictional force significantly decreases at height regions of 5 nm or more, but up to 30 nm, of the element pad 18. A projecting profile of a head element (element pad 18) when the electric power is supplied to the heater 26 at output levels of 40 mW and 70 mW is measured for two sliders whose element pads 18 are 0 nm and 10 nm high. Measurement results on the profile of a neighboring section of the head element when viewed cross-sectionally from a leading end, towards a trailing end, are shown in FIG. 5. FIG. 5(*b*) is for the height of 10 nm (embodiment), and FIG. 5(*a*) is for the height of 0 nm (comparative example). Horizontal axes in FIGS. 5(*a*) and 5(*b*) indicate distances from the leading end position of a leading end pad 16 taken as 0. As is evident from these figures, in the comparative example, although the head element projects, a gradient of this projecting section is gentle when viewed from the surface of the trailing end pad 16. In the embodiment, however, it can be seen that there is a difference in level (height) of 10 nm and that the element pad 18 projects.

Figure 6A:
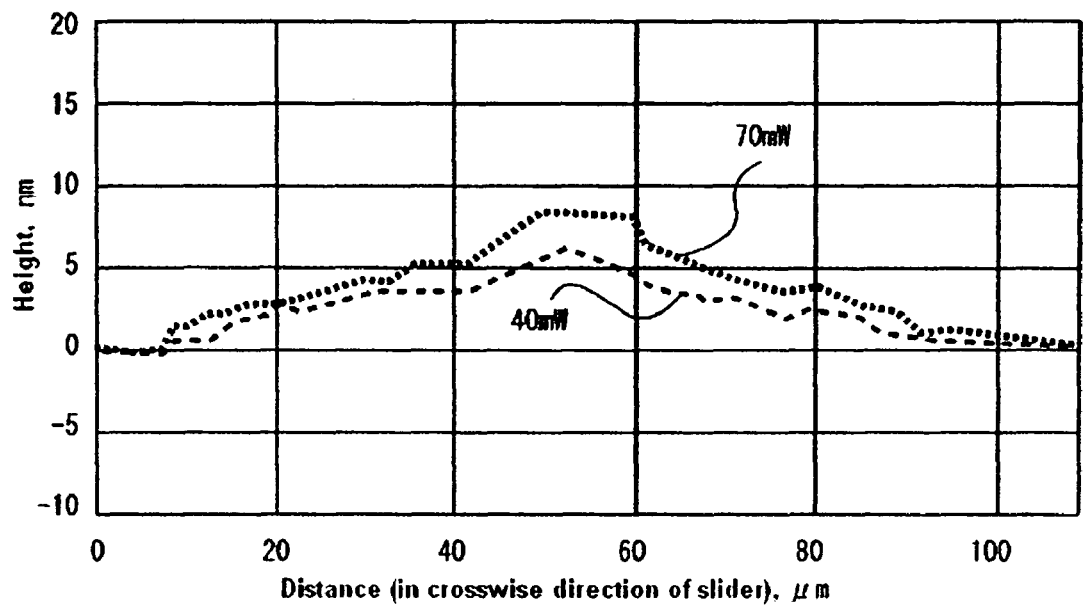
FIGS. 6(a) and 6(b) are diagrams showing a projecting profile of the element pad in a crosswise direction of the slider.
Figure 6B:
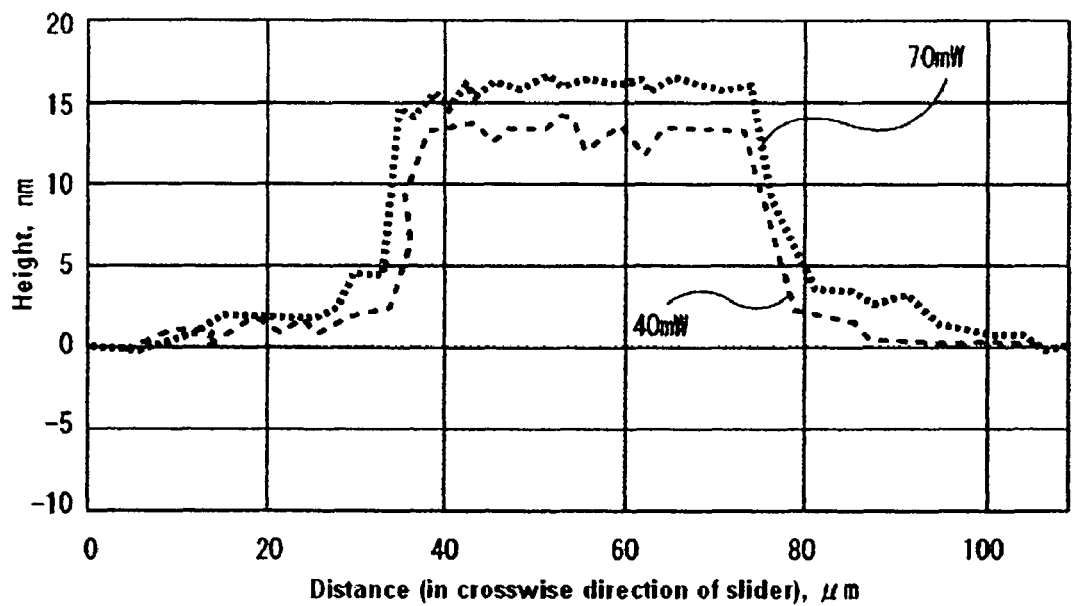

Measurement results on a profile of the head element in a direction perpendicular to the above-discussed measuring direction, that is, in a crosswise direction of the magnetic head slider, are shown in FIG. 6. FIG. 6(*a*) is for the 0-nm height of the element pad 18 in the comparative example, and FIG. 6(*b*) is for the 10-nm height of the element pad 18 in the embodiment. It can be seen that in the perpendicular direction, the projecting section in the comparative example is also gentle in gradient, and thus a contact area of the head element with respect to the magnetic disk naturally increases in comparison with the contact area in the embodiment.

The above results indicate that it is possible, by forming the element pad 18 so that the height thereof ranges from 5 nm to 30 nm, to reliably reduce the contact area of the head element when it is caused to project and come into contact with the magnetic disk, and hence to reduce the frictional force. Since the vibration of the magnetic head slider due to the frictional force can be suppressed by reducing the frictional force, risks of magnetic head element wear and damage can be lessened.

Figure 7:
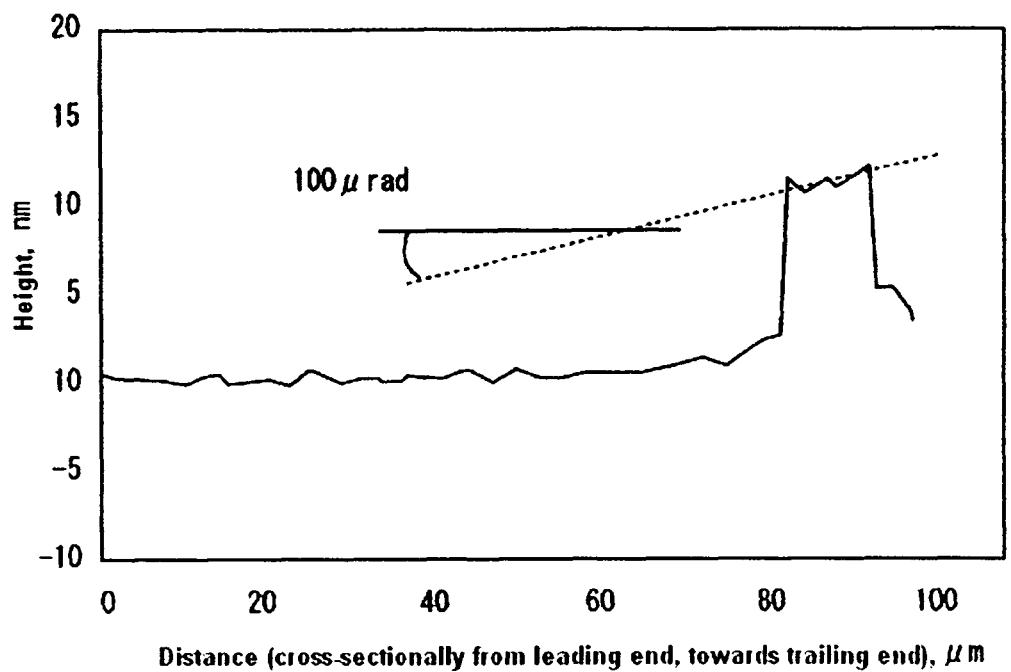
FIG. 7 is a diagram showing an inclination angle of the element pad.
Figure 8:
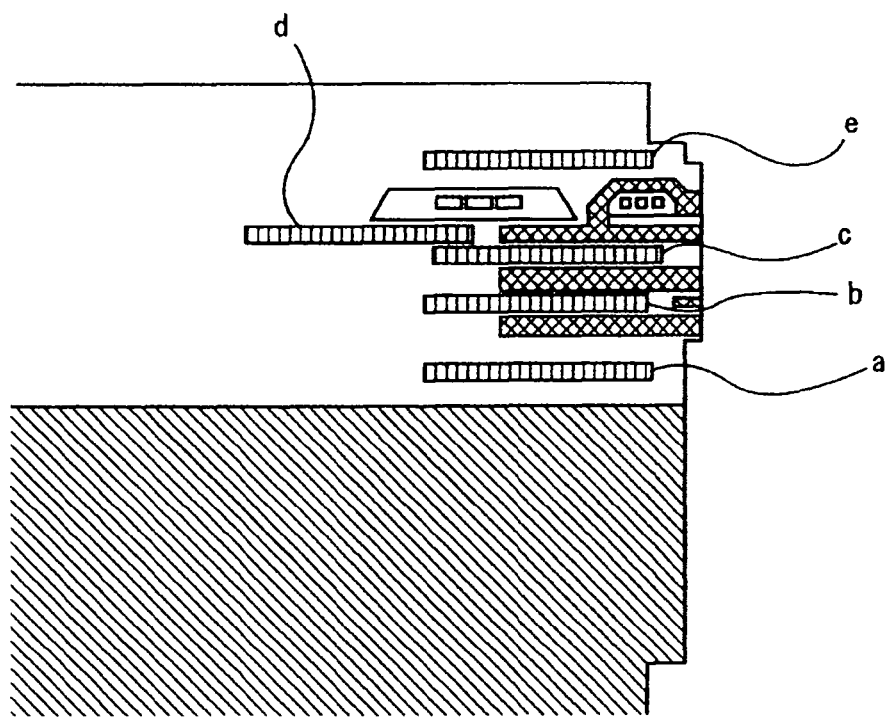
FIG. 8 is an enlarged sectional view of the head element existing when a position of a heater is changed.
Figure 9:
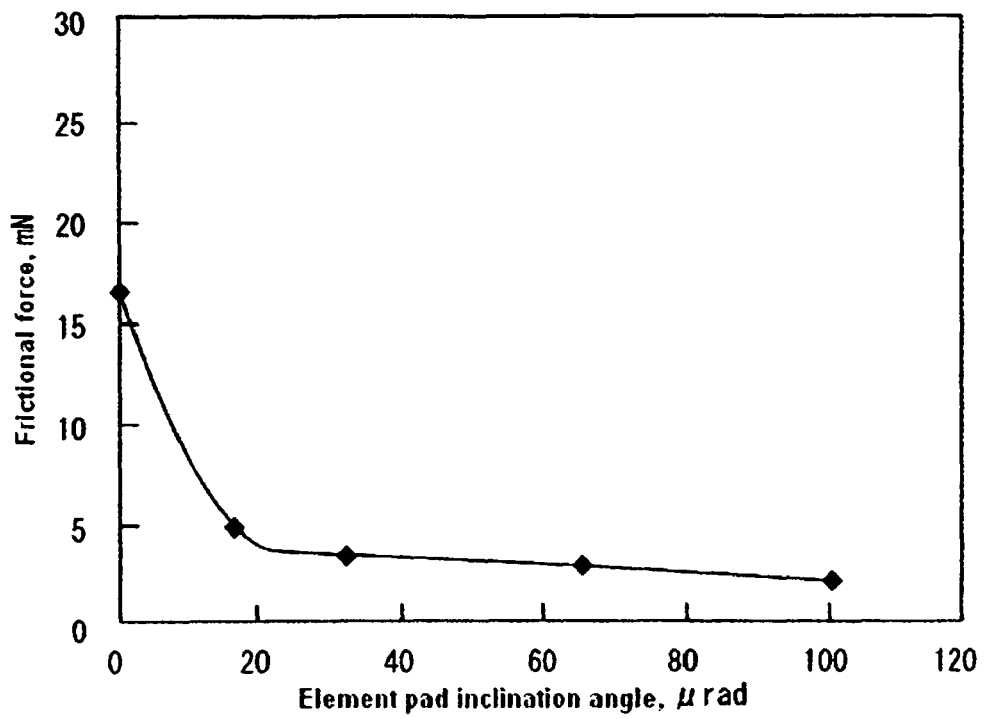
FIG. 9 is a diagram showing a relationship between the inclination angle of the element pad and the frictional force.

Next, a profile that focuses attention on an inclination of the element pad is shown in FIG. 7. It can be seen that the element pad has an inclination of about 100 μrad to a baseline of the slider. The heater power at this time is 70 mW. This is due to the fact that the element pad is inclined by thermal deformation. It can be easily seen that as a result, a contact area of the element pad with respect to the magnetic disk significantly decreases in comparison with a case in which the inclination is 0 rad. Therefore, heads that differ in inclination angle when a current is supplied to the heater with its position changed as in FIG. 8, are created for comparison purposes. At heater position "a", an inclination angle of 65 μrad is obtained for a heater power output of 40 mW at the same position as in the foregoing embodiment, at heater position "b", 100 μrad is obtained, at heater position "c", 60 μrad is obtained, at heater position "d", 16 μrad is obtained, and at heater position "e", 32 μrad is obtained. The element pad has a 10 μm×40 μm rectangular shape with a radius of curvature, R, at corners, and is 10 nm high. When heater power is off, 10 μrad is obtained. It is considered from these results that to obtain a greater inclination angle of the pad, it is effective to dispose the heater at a section near the read/write element and closer to the air bearing surface. Recapitulation results on the relationship between the inclination of the element pad 18 and the frictional force are shown in FIG. 9. It is obvious from these results that the contact area of the element pad 18 with respect to the magnetic disk, compared with the contact area in the case of the element pad inclination being 0 rad, decreases as the inclination increases. It can therefore be seen that the inclination of the element pad 18 due to the projection of the head element by heating reduces the frictional force significantly. FIG. 9 indicates that 25 μrad or more may be preferred. In addition, although an upper limit cannot be set too high because of restrictions at the position of the heater, setting 100 μrad or less as the upper limit yields a frictional force reduction effect and makes manufacturing possible. This inclination angle, considered to differ in a particular structure of the heater, is achievable by conducting heater power control or structural optimization for an inclination of at least 2 μrad.

Figure 10:
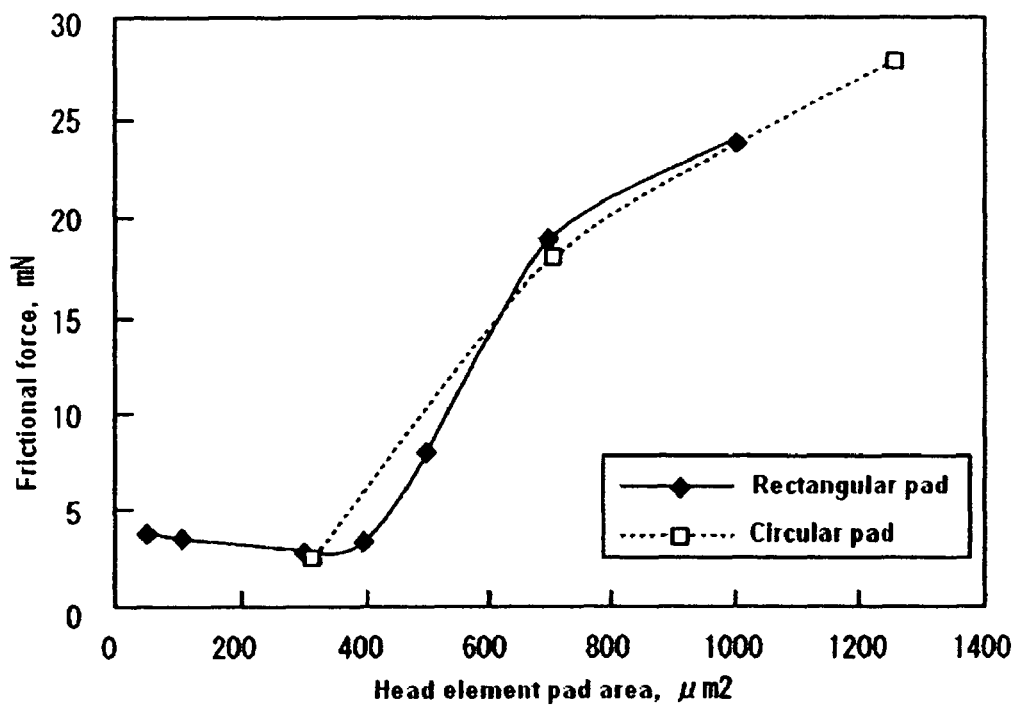
FIG. 10 is a diagram showing a relationship between an area of the head element pad and the frictional force.

Next, study results on how the frictional force changes according to the particular area of the element pad 18 are described below. Similarly to the above, the frictional force is measured by using rectangular magnetic head sliders formed to have areas of 10 μm×5 μm, 10 μm×10 μm, 10 μm×30 μm, 10 μm×40 μm, 10 μm×50 μm, 10 μm×70 μm, 10 μm×100 μm, and circular magnetic head sliders formed to have radii of 10 μm, 15 μm, 20 μm. The element pads 18 of each magnetic head slider are all 10 nm high. Measurement results are shown in FIG. 10. It can be seen that irrespective of whether the element pad 18 is rectangular or circular, the frictional force dwindles with decreases in area and takes very small values for areas of 500 $\mu m^2$ or less. These results indicate that an excellent magnetic head slider small in frictional force can be constructed by forming an element pad 18 with an area of 500 $\mu m^2$ or less, but equal to or greater than 50 $\mu m^2$. While studies have been conducted in rectangular and circular shapes, a frictional force reduction effect equivalent to that can be obtained by forming the area as a required value, even in an elliptical shape or a polygonal shape with corners of a circular arc form.

In addition, a contact surface pressure reduction effect can be obtained by forming an area of 500 $\mu m^2$ or less of the element pad 18.

As described above, it is possible, by forming the trailing end pad into a two-stage shape, forming an element pad whose height from the trailing end pad is 5 nm or more, but up to 30 nm, and forming this element pad with an area of 50 $\mu m^2$ or more, but up to 500 $\mu m^2$, to reliably reduce the contact area of the head element when it is caused to project and come into contact with the magnetic disk, and hence to lessen the frictional force. Since the vibration of the magnetic head slider due to the frictional force can be suppressed by reducing the frictional force, risks of magnetic head element wear and damage can be lessened. In addition, a magnetic disk drive in which such a magnetic head slider and a magnetic disk with a surface roughness of 0.25 nm or less in centerline average roughness "Ra" are mounted can be reduced in the flying height of the magnetic head slider and improved in recording density.

What is claimed is:

1. A magnetic head slider comprising:
   a slider;
   a head element formed at an end of the slider, the head element including a heater, a read element, and a write element;
   a deep groove;
   a leading end side rail higher than the deep groove;
   a trailing end side rail higher than the deep groove;
   a leading end pad formed on the leading end side rail; and
   a trailing end pad formed on the trailing end side rail;
   wherein the deep groove, the leading end side rail, the trailing end side rail, the leading end pad, and the trailing end pad are each formed on an air bearing surface which forms part of the slider and the head element, and
   wherein an element pad is provided on the trailing end pad, the element pad including the read element and the write element, having an area of 50-500 μm2, and being 5-30 nm higher than the trailing end pad.

2. The magnetic head slider according to claim 1, wherein the element pad is rectangular.

3. The magnetic head slider according to claim 1, wherein the element pad is circular.

4. The magnetic head slider according to claim 1, wherein the element pad is elliptical.

5. The magnetic head slider according to claim 1, wherein the element pad has polygonal corners of a circular arc shape.

6. The magnetic head slider according to claim 1, wherein the heater is disposed between the slider and the read element or between the write element and the read element.

7. The magnetic head slider according to claim 6, wherein the element pad, when heated by the heater, protrudes at an inclination angle of 20-100 μrad with respect to a flat surface of the slider.

8. The magnetic head slider according to claim 1, wherein the heater is disposed between magnetic shields of the read element.

9. The magnetic head slider according to claim 1, further comprising a carbon protective film on the element pad.

10. The magnetic head slider according to claim 1, wherein the leading end pad and the element pad are of the same height.

11. A magnetic disk drive comprising:
    a magnetic disk whose surface roughness is equal to or less than 0.25 nm in centerline average roughness Ra; and
    a magnetic head slider which includes a slider, a head element formed at an end of the slider, the head element including a heater, a read element, and a write element, a deep groove, a leading end side rail higher than the deep groove, a trailing end side rail higher than the deep groove, a leading end pad formed on the leading end side rail, a trailing end pad formed on the trailing end side rail, and an element pad formed on the trailing end pad;
    wherein the deep groove, the leading end side rail, the trailing end side rail, the leading end pad, and the trailing end pad are each formed on an air bearing surface which forms part of the slider and the head element, and
    wherein the element pad includes the read element and the write element, the element pad having an area of 50-500 μm2 and being 5-30 nm higher than the trailing end pad.

* * * * *